United States Patent
Sutou et al.

(10) Patent No.: US 10,501,565 B2
(45) Date of Patent: Dec. 10, 2019

(54) CURABLE COMPOSITION

(71) Applicant: TOAGOSEI CO., LTD., Minato-ku (JP)

(72) Inventors: Masahiro Sutou, Takaoka (JP); Masaru Ando, Takaoka (JP)

(73) Assignee: TOAGOSEI CO., LTD., Minato-ku (JP)

( * ) Notice: Subject to any disclaimer, the term of this patent is extended or adjusted under 35 U.S.C. 154(b) by 0 days.

(21) Appl. No.: 15/745,820

(22) PCT Filed: Jul. 13, 2016

(86) PCT No.: PCT/JP2016/070663
§ 371 (c)(1),
(2) Date: Jan. 18, 2018

(87) PCT Pub. No.: WO2017/014124
PCT Pub. Date: Jan. 26, 2017

(65) Prior Publication Data
US 2018/0208690 A1    Jul. 26, 2018

(30) Foreign Application Priority Data
Jul. 21, 2015  (JP) ................................. 2015-144348

(51) Int. Cl.
*C08F 122/32* (2006.01)
*C09J 11/04* (2006.01)
*C09J 4/00* (2006.01)
*C08F 2/44* (2006.01)
*C08F 292/00* (2006.01)

(52) U.S. Cl.
CPC .............. *C08F 122/32* (2013.01); *C08F 2/44* (2013.01); *C08F 292/00* (2013.01); *C09J 4/00* (2013.01); *C09J 11/04* (2013.01)

(58) Field of Classification Search
None
See application file for complete search history.

(56) References Cited

U.S. PATENT DOCUMENTS

| | | | | |
|---|---|---|---|---|
| 4,102,945 A * | 7/1978 | Gleave | ........................ | C09J 4/06 156/331.1 |
| 4,280,911 A * | 7/1981 | Durda | .................. | B01F 3/04539 210/629 |
| 4,720,513 A * | 1/1988 | Kameyama | ............... | C08K 9/06 523/203 |
| 4,837,260 A * | 6/1989 | Sato | ...................... | A61B 5/1172 523/212 |
| 5,100,494 A * | 3/1992 | Schmidt | ................ | B29C 65/342 156/712 |
| 7,569,634 B2 * | 8/2009 | Kaszubski | ............... | C08J 5/124 523/218 |
| 2005/0042266 A1* | 2/2005 | Narang | ................ | A61L 24/0015 424/448 |
| 2005/0211580 A1* | 9/2005 | Kaszubski | ............... | C08J 5/124 206/223 |
| 2007/0137784 A1* | 6/2007 | McDonnell | ................ | C09J 5/00 156/293 |
| 2012/0264846 A1* | 10/2012 | Zhang | .................. | A61K 31/785 523/118 |

FOREIGN PATENT DOCUMENTS

| | | |
|---|---|---|
| JP | 61-168679 A | 7/1986 |
| JP | 2-6576 A | 1/1990 |
| JP | 3-167279 A | 7/1991 |
| JP | 2005-226033 A | 8/2005 |

OTHER PUBLICATIONS

Extended European Search Report dated Feb. 22, 2019 in Patent Application No. 16827684.8.
International Search Report dated Sep. 6, 2016, in PCT/JP2016/070663, filed Jul. 13, 2016.
Office Action dated Jun. 17, 2019 in Chinese Patent Application No. 201680041751.5 (w/ English translation).
Office Action dated Sep. 19, 2019 in Taiwan Patent Application No. 105122611 (w/ English translation), the Office Action being received Oct. 18, 2019 by individuals designated in 37 CFR §1.56(c).

* cited by examiner

*Primary Examiner* — Joseph D Anthony
(74) *Attorney, Agent, or Firm* — Oblon, McClelland, Maier & Neustadt, L.L.P.

(57) ABSTRACT

The present invention is a curable composition characterized by including a 2-cyanoacrylate and a particle containing titanium oxide and silicon oxide. The preferable content of the particle is in a range from 0.1 to 10.0 parts by mass based on 100 parts by mass of the 2-cyanoacrylate.

9 Claims, No Drawings

CURABLE COMPOSITION

TECHNICAL FIELD

The present invention relates to a curable composition that has adhesiveness and is suitable for forming a white-based cured resin portion, and to an adhesive composition.

BACKGROUND ART

A 2-cyanoacrylate is polymerized and cured in a short period of time by anion species of moisture and the like on a surface of an adherend and in air because of its high anionic polymerizability, and the 2-cyanoacrylate is widely used as a raw material for an instantaneous adhesive for adhering articles to each other; a filler; and the like.

Titanium oxide is widely used as a pigment blended in a coating material that imparts a film having a high whiteness, and the other article.

In recent years, there has beets known a technique of forming a white cured portion using a liquid composition that contains a 2-cyanoacrylate and a titanium oxide-based pigment obtained by modifying the surface of highly active titanium oxide, in order to conceal defects and the like on the surface of an article and to easily discriminate whether or not coating and filling and the like have been made at a predetermined position (for example, see Patent. Document 1). The Patent Document 1 discloses a composition containing a 2-cyanoacrylate as a main component and titanium oxide treated with polysiloxane.

For example, when white articles are adhered to each other using such a composition to prepare a composite, a joint portion formed of a cured resin portion has the same white color as that of the article, whereby the composite having high design property is inferred to be obtained.

PRIOR TECHNICAL DOCUMENT

Patent Document

[Patent Document 1] JP-A 2005-226033

SUMMARY OF THE INVENTION

Problems that the Invention is to Solve

The composition described in the Patent Document 1 exhibits certain effects on storage stability and concealability after use. However, the composition disadvantageously has a low adhesion speed.

It is an object of the present invention to provide a curable composition that has excellent storage stability, and can rapidly form a cured resin portion (film and the like) having excellent concealability of a defective portion (base) on a surface of an article, and to provide; an adhesive composition having excellent storage stability and adhesiveness.

Means for Solving the Problems

The present inventors have studied a cured resin forming material that contains a 2-cyanoacrylate conventionally known as a main component for an instantaneous adhesive and a titanium oxide-containing particle, and that has further improved storage stability. As a result, the me of particle containing both titanium oxide and silicon oxide as the titanium oxide-containing particle was found to provide an excellent cured resin forming material.

That is, an aspect of the present invention is a curable composition containing a 2-cyanoacrylate and a particle containing titanium oxide and silicon oxide. Another aspect of the present invention is an adhesive composition containing a 2-cyanoacrylate and a particle containing titanium oxide and silicon oxide.

Effects of the Invention

The curable composition of the present invention is excellent in storage stability, and is suitable for forming a white-based cured resin portion (film and the like) having excellent concealability of a defective portion (base) on a surface of an article, and fix forming an integrated product provided by the adhesion of a plurality of articles. The curable composition of the present invention has a high adhesion speed, and has an effect of improving workability or productivity during use.

The adhesive composition of the present invention is excellent in storage stability and adhesiveness.

EMBODIMENTS FOR CARRYING OUT THE INVENTION

Hereinafter, the present invention is described in detail.

The curable composition of the present invention is a liquid composition including a 2-cyanoacrylate and a particle containing titanium oxide and silicon oxide (hereinafter referred to as "composite particle").

The 2-cyanoacrylate is not particularly limited. A cyanoacrylic acid (cyclo)alkyl ester, a cyanoacrylic acid alkenyl ester, a cyanoacrylic acid alkynyl ester, a cyanoacrylic acid alkoxyalkyl ester, a cyanoacrylic acid haloalkyl ester, a cyanoacrylic acid haloalkoxyalkyl ester, and the like can be used. In the present invention, the 2-cyanoacrylate may be used singly or in combination of two or more types thereof.

Examples of the cyanoacrylic acid alkyl ester include methyl-2-cyanoacrylate ethyl-2-cyanoacrylate, n-propyl-2-cyanoacrylate, isopropyl-2-cyanoacrylate, n-butyl-2-cyanoacrylate, isobutyl-2-cyanoacrylate, n-hexyl-2-cyanoacrylate, n-octyl-2-cyanoacrylate, 2-ethylhexyl-2-cyanoacrylate, cyclohexyl-2-cyanoacrylate, phenyl-2-cyanoacrylate, benzyl-2-cyanoacrylate, and the like.

Examples of the cyanoacrylic acid alkenyl ester include allyl-2-cyanoacrylate, and the like.

Examples of the cyanoacrylic acid alkynyl ester include propargyl-2-cyanoacrylate, and the like.

Examples of the cyanoacrylic acid alkoxyalkyl ester include methoxymethyl-2-cyanoacrylate methoxyethyl-2-cyanoacrylate, methoxybutyl-2-cyanoacrylate, ethoxyethyl-2-cyanoacrylate, and the like.

Examples of the cyanoacrylic acid haloalkoxyalkyl ester include 2-chloroethyl-2-cyanoacrylate, 2-chloroethoxyethyl-2-cyanoacrylate, 2,2,2-trifluoroethyl-2-cyanoacrylate, and the like.

The 2-cyanoacrylate preferably contains, a cyanoacrylic acid alkyl ester from viewpoints of flowability, curability, adhesion speed and the like of the composition, and more preferably contains a cyanoacrylic acid alkyl ester having an alkyl portion having 1 to 4 carbon atoms.

The composite particle is a component for improving the storage stability of the curable composition of the present invention, and is a particle containing titanium oxide and silicon oxide. The composite particle may further contain other materials described later. A ratio of a total amount of titanium oxide and silicon oxide contained in the composite particle is preferably in a range from 90% to 100% by mass and more preferably from 95% to 100% by mass with respect to the whole composite particle.

Proportions of the titanium oxide and the silicon oxide are preferably 70% to 96% by mass and 4% to 30% by mass, and more preferably 80% to 90% by mass and 10% to 20% by mass, respectively, based on 100% by mass of a total content of the titanium oxide and the silicon oxide from viewpoints of storage stability and concealability of a base.

The composite particle containing titanium oxide and silicon oxide is usually in a white color, however, the composite particle may appear as a gray color and the like other than the white color depending on the crystal structure of titanium oxide or the proportions of titanium oxide and silicon oxide.

A shape of the composite particle is not particularly limited, and may be spherical, elliptical spherical, plate-like (flake), polyhedron, linear, hollow, cylindrical shapes and the like depending on the preferred embodiment. From a viewpoint of the concealability of a base, the composite particle is preferably in solid body.

The structure of the composite particle is not particularly limited, and can take the following embodiments:
(X) an embodiment in which one portion made of one material and other portion (may be 2 or more) made of other material are integrated, and the entire surface of the one portion is coated with the other portion; and
(Y) an embodiment in which a portion made of titanium oxide and a portion (may be two or more) made of other material containing silicon oxide are integrated, and the both portions are exposed.

Composite particles in the embodiment (X) are exemplified as follows:
(X1) a covered type particle, having a covering portion made of silicon oxide, on an entire surface of a granular portion made of titanium oxide;
(X2) a covered type particle having a first covering portion made of silicon oxide and a second covering portion made of a hydrophobic material in order on an entire surface of a granular portion made of titanium oxide;
(X3) a covered type particle having a covering portion made of silicon oxide on an entire surface of an aggregate containing a titanium oxide, particle and a particle made of other inorganic material;
(X4) a covered type particle having a first covering portion made of silicon oxide and a second covering portion made of a hydrophobic material in order on an entire surface of an aggregate containing a titanium oxide particle and a particle made of other inorganic material;
(X5) a covered type particle having a first covering portion made of other inorganic material and a second covering portion made of silicon oxide in order on an entire surface of a granular portion made of titanium oxide;
(X6) a covered type particle having a first covering portion made of other inorganic material, a second covering portion made of silicon oxide, and a third covering portion made of a hydrophobic material in order on an entire surface of a granular portion made of titanium oxide;
(X7) a covered type particle having a first covering portion made of titanium oxide and a second covering portion made of silicon oxide in order on an entire surface of a granular portion made of other inorganic material; and
(X8) a covered type particle having a first covering portion made of titanium oxide, a second covering portion made of silicon oxide, and a third covering portion made of a hydrophobic material in order on an entire surface of a granular portion made of other inorganic material.

Composite particles of the embodiment (Y) are exemplified as fellows;
(Y1) a partially covered type particle having a covering portion made of silicon oxide partially formed on a surface of a granular portion made of titanium oxide, in a state there at least a part of the granular portion is exposed;
(Y2) a partially covered type particle having a first covering portion made of silicon oxide partially formed on a surface of a granular portion made of titanium oxide, and a second covering portion made of a hydrophobic material partially formed on a surface of the first covering portion, in a state where at least a part of the granular portion and at least a part of the first covering portion are exposed;
(Y3) a partially covered type particle having a covering portion made of silicon oxide on a surface of an aggregate containing a titanium oxide particle and a particle made of other inorganic material, in a state where at least a part of a surface of the aggregate is exposed;
(Y4) a partially covered type particle having a first covering portion made of silicon oxide partially formed on a surface of an aggregate containing a titanium oxide particle and a particle made of other inorganic material, and a second covering portion made of a hydrophobic material partially formed on a surface of the first covering portion, in a state where at least a part of a surface of the aggregate and at least a part of the first covering portion are exposed;
(Y5) a partially covered type particle having a first covering portion made of other inorganic material partially formed on a surface, of a granular portion made of titanium oxide, and a second covering portion made of silicon oxide partially formed on a surface of the first covering portion, in a state where at least a part of the granular portion and at least apart of the first covering portion are exposed;
(Y6) a partially covered type particle having a first covering portion made of other inorganic material partially formed on a surface of a granular portion made of titanium oxide, a second covering portion made of silicon oxide partially formed on a surface of the first covering portion, and a third covering portion made of a hydrophobic material partially formed on a surface of the second covering portion, in a state where at least a part of the granular portion, at least a part of the first covering portion, and at least a part of the second covering portion are exposed;
(Y7) a partially covered type particle having a first covering portion made, of titanium oxide partially formed on a surface of a granular portion made of other inorganic material, and a second covering portion made of silicon oxide partially formed on the surface of the first covering portion, in: a state where at least apart of the granular portion and at least a part of the first covering portion are exposed;
(Y8) a partially covered type particle having a first covering portion made of titanium oxide partially formed on a surface of a granular portion made of other inorganic material, a second covering portion made of silicon oxide partially formed on a surface of the first covering portion, and a third covering portion made of a hydrophobic material partially formed on a surface of the second covering portion, state where at least a part of the granular portion, at least a part of the first covering portion, and at least a part of the second covering portion are exposed;
(Y9) a layered type particle in which a titanium oxide layer and a silicon oxide layer are joined;
(Y10) a layered type particle in which a titanium oxide layer, a layer made of other inorganic material, and a silicon oxide layer are sequentially joined and a side face of the layer made of other inorganic material is exposed;

(Y11) a layered type particle in which a layer made of other inorganic material, a titanium oxide layer, and a silicon oxide layer are sequentially joined and a side face of the titanium oxide layer is exposed; and (Y12) a layered type particle in which a layer made of other inorganic material, a silicon oxide layer, and a titanium oxide layer are sequentially joined and a side face of the silicon oxide layer is exposed.

As the hydrophobic material, an organic material such as an organic silicon compound having an alkyl group including, a compound containing a trimethylsilyl group, a dimethylsilyl group, a monomethylsilyl group or the like, and a silicon-containing polymer compound including dimethyl silicone oil; and an inorganic material such as a hydrophobic zeolite having an increased content rate of silica, a hydrotalcite-based compound having a hydrophobic organic material inserted between layers, and a zirconium phosphate-based compound can be used.

As the above other inorganic material, an oxide excluding titanium oxide and silicon oxide, a carbide, a nitride, a boride, a sulfide, a halide, a hydrochloride, a sulfate, a nitrate, a carbonate, a phosphate, a metal complex, a metal, an alloy, carbon, and the like can be used. It is preferable that the other inorganic material have the color same as or similar to that of titanium oxide or silicon oxide. Examples of the other oxide include magnesium oxide, calcium oxide, barium oxide, aluminum oxide, zinc oxide, tin oxide, a silica-based composite oxide such as a composite oxide containing silicon, and zirconium, antimony, tungsten, tin, aluminum, niobium, cerium, zinc, or the like, and the like.

In the present invention, both the above embodiments (X) and (Y) are preferable. Particularly preferred is a (partially) covered type particle in the embodiment in which a portion made of titanium oxide is completely covered with other material or a part of the portion made of titanium oxide is exposed (a plurality of places may be exposed, but for example, the total area exposed is 30% or less, that is, the covering ratio provided by the other material is 70% or more).

A size of the composite particle depends on the shape thereof, but when the composite particle has a spherical shape, an elliptical spherical shape, a plate-like shape, a polyhedral shape, or the like, a maximum diameter (maximum length) measured by an electron microscope or the like is preferably 100 nm, and more preferably 80 nm. A lower limit of the maximum diameter is usually 10 nm.

A preferable production method of the composite particle in the present invention will be described below.

In the curable composition of the present invention, a content of the composite particle is preferably in a range from 0.1 to 10.0 parts by mass, more preferably from 0.2 to 5.0 parts by mass, and further preferably from 0.3 to 3.0 parts by mass based on 100 parts by mass of the above 2-cyanoacrylate from viewpoints of the concealability of a base, adhesiveness to the base, and the like.

The curable composition of the present invention may include particles other than the composite particle as long as the desired effects of the invention are not impaired. The other particles may be made of either an organic material or an inorganic material. Examples of the inorganic material include an oxide, a carbide, a nitride, a boride, a sulfide, a halide, a hydrochloride, a sulfate, a nitrate, a carbonate, a phosphate, a metal complex, a metal, an alloy, carbon and the like. The organic material may be a compound that forms an organic pigment and the like.

A shape and size of the other particles are not particularly limited, and may be the shape and size of the composite particle.

It necessary, the curable composition of the present invention may include conventionally publicly known additives for resins such as a curing accelerator, an anionic polymerization inhibitor (sulfur dioxide, p-toluenesulfonic acid, methanesulfonic acid, propanesultone boron trifluoride complex and the like), a radical polymerization inhibitor (hydroquinone, catechol, pyrogallol and the like), a thickener, an adhesion improver, a thixotropic agent, a filler, a plasticizer, an ultraviolet absorber, a stabilizer, and a softener and the like. The curable composition may further include other component such as a colorant and an organic solvent. As described above, the composite particle is in a white color or a color close thereto. When the color of a cured resin portion is changed to the other colors, a coloring agent in other colors (organic or inorganic dyes or pigments) can be used. In this case, a solubility of the colorant in 2-cyanoacrylate or the organic solvent is not particularly limited.

Since the curable composition of the present invention has excellent adhesiveness with respect to an adherend made of an inorganic material, an organic material, or a composite material containing these materials, the curable composition can be used as an adhesive composition. When the curable composition is applied or injected to a predetermined position of the adherend, or the predetermined position is filled with the curable composition, a cured resin portion having excellent adhesiveness with respect to a base can be formed. In a case where the cured resin portion is a film, and has a thickness of, for example, 25 µm or more, the concealability of the base can be provided.

A representative production method of (partially) covered type particle that is a preferable composite particle is a gas phase method or a liquid phase method, and is exemplified as follows:

(1) a method including: evaporating a mixture containing an evaporable silicon compound such as silicon tetrachloride and an evaporable titanium compound such as titanium tetrachloride at a temperature of 200° C. or lower to obtain a gas; supplying the gas into a reaction tube together with hydrogen gas and air or an rich in oxygen utilizing the stream of an inert gas such as nitrogen as igniting the raw material mixture at an opening of the reaction tube to burn the raw material mixture in the reaction tube, thereby to form a covered type particle having a covering portion made of silicon oxide on at least a part of a surface of a granular portion made of titanium oxide; and supplying the covered type particle into a cooled flame tube.

(2) a method including: mixing a mixture containing an evaporable silicon compound such as silicon tetrachloride, an evaporable titanium compound such as titanium tetrachloride, and an inert gas with hydrogen gas and air; and beating the raw material mixture at a temperature ranging from 1000° C. to 3000° C. to form a covered type particle having a covering portion made of silicon oxide on at least a part of a surface of a granular portion made of titanium oxide.

(3) a method including: bringing a titanium oxide powder or a powder obtained by forming a first covering portion made of titanium oxide on a surface of a granular portion made of other inorganic material into contact with a silicon tetrachloride gas, a silicon tetrachloride liquid, or a mixing liquid containing the silicon tetrachloride liquid and an organic solvent to produce a covered type particle having silicon oxide in a surface layer.

(4) a method including: aggregating a titanium oxide powder and a powder made of other inorganic material using a coagulant containing a cationic polymer, an anionic polymer, or a nonionic polymer; and bringing the aggregate into contact with a silicon tetrahalide gas, a silicon tetrachloride liquid, or a mixed liquid containing the silicon tetrachloride liquid and an organic solvent to produce a covered type particle having silicon oxide in a, surface layer.

(5) a method including: bringing a titanium oxide powder or a powder in which a first covering portion made of titanium oxide is formed on a surface of granular portion made of other inorganic material into contact with an aqueous solution containing a silicate such as sodium silicate; and neutralizing the solution using an acid to produce a covered type particle having silicon oxide in a surface layer.

(6) a method including: aggregating a titanium oxide powder and a powder made of other inorganic material using a coagulant containing a cationic polymer, an anionic polymer, or a nonionic polymer; bringing the aggregate into contact with an aqueous solution containing a silicate such as sodium silicate; and neutralizing the solution using an acid to produce a covered type particle having silicon oxide in a surface layer.

(7) a method including: bringing a titanium oxide powder or a powder in which a first covering portion made of titanium oxide is formed on a surface of a granular portion made of other inorganic material into contact with a composition containing silicic acid or a tetraaloxysilane, water, and an inorganic alkali or an organic alkali and allowing the mixture to stand or heating the mixture at a low temperature to produce a covered type particle having silicon oxide in a surface layer, and (8) a method including: aggregating a titanium oxide powder and a powder made of other inorganic material using a coagulant containing a cationic polymer, an anionic polymer, or a nonionic polymer, bringing the aggregate into contact with a composition containing silicic acid or a trialkoxysilane, water, and an inorganic alkali or an organic alkali, and allowing the mixture to stand or heating the mixture at a low temperature to produce a covered type particle having silicon oxide in a surface layer.

Examples of a forming method of a covered portion made of a hydrophobic material at an outermost surface layer include a method in which a (partially) covered type particle is brought into contact with a silane coupling agent; a method in which a (partially) covered type particle is brought into contact with an organosilicon compound such as dimethyldichlorosilane, hexanethyldi silane, and silicone oil, to react an OH group remaining on the surface of the (partially) covered type particle with the organosilicon compound; and the like.

EXAMPLES

Hereinafter, the present invention is specifically described using Examples. The present invention is not limited to the following Examples.

1. Raw Materials for Curable Composition

Raw materials used for producing a curable composition are as follows.

1-1. 2-cyanoacrylate

Ethyl-2-cyanoacrylate containing 20 ppm by mass of sulfur dioxide and 1000 ppm by mass of hydroquinone was used.

1-2. Particle

Hereinafter, the configuration of each particle and the average primary particle diameter measured by an electron microscope are show.

(1) Particle A

A composite oxide particle obtained by a gas phase method using a silicon tetrachloride gas and a titanium tetrachloride gas was used. The composite oxide particle is consisting of 85% by mass of titanium oxide and 15% by mass of silicon oxide, and has a covering portion made of silicon oxide on at least a part of the surface of a granular portion made of titanium oxide. All average primary particle size is about 14 nm.

(2) Particle B

A particle obtained by subjecting the surface of the particle A to a hydrophobic treatment with hexamethyldisilazane was used. An average primary particle size is about 14 nm.

(3) Particle C

A composite oxide particle obtained by a gas phase method using a silicon tetrachloride gas and a titanium tetrachloride gas was used. The composite oxide particle is consisting of 95% by mass of titanium oxide and 5% by mass of silicon oxide, and has a covering portion made of silicon oxide on at least a part of the surface of a granular portion made of titanium oxide. An average primary particle size is about 21 nm.

(4) Particle D

A particle obtained by subjecting the surface of the particle C to a hydrophobic treatment with hexamethyldisilazane was used. An average primary particle size is about 21 nm.

1-3. Particle for Comparative Example (5) Particle E

A particle made of titanium oxide was used. An average primary particle size is about 21 nm.

(6) Particle F

A particle obtained by subjecting the surface of the particle E to a hydrophobic treatment with an alkylsilane was used. An average primary particle size is about 21 nm.

(7) Particle G

A particle made of titanium oxide was used. An average primary particle size is about 14 nm.

(8) Particle H

A particle obtained by subjecting the surface of the particle G to a hydrophobic treatment with an alkylsilane was used. An average primary particle size is about 14 nm.

(9) Particle I

A particle obtained by subjecting a particle made of titanium oxide treated with a polysiloxane to washing with an acetone solution containing 1% by mass of an acidic substance (p-toluenesulfonic acid) was used. An average primary particle size is about 300 nm.

(10) Particle J

A particle obtained by subjecting the surface of a fumed silica particle to a hydrophobic treatment with dimethylpolysiloxane was used. An average primary particle size is about 12 nm.

(11) Particle K

A particle obtained by subjecting the surface of an alumina particle to a hydrophobic treatment with an alkylsilane was used. An average primary particle size is about 13 nm.

2. Production and Evaluation of Curable Composition

The above-mentioned raw materials were placed in a polyethylene container and sealed. The raw materials were stirred and mixed at a temperature of 25° C. to produce a curable composition. The curable composition was subjected to various evaluations.

Example 1

100 parts by mass of ethyl-2-cyanoacrylate and 0.5 parts by mass of the particle A were used to obtain a curable composition (see Table 1). Concealability and storage stability were evaluated by the following method.

(1) Concealability

A curable composition was dropped onto a transparent sheet made of polyethylene balate, and applied using a Baker type applicator, and a curing accelerator "aa·accelerator" (trade name) manufactured by Toagosei Co., Ltd., was sprayed onto a coat. Then, the sheet was allowed to stand for 1 minute in a box having an atmosphere of the curing accelerator to form a white cured film having a thickness of about 25 μm, thereby to obtain a stacked sheet. The stacked sheet was placed on a newspaper, and whether letters of the newspaper could be clearly recognized from the upper position separated by 30 cm from the newspaper was tested.

◯: The stacked sheet had such concealability that the letters of the newspaper were not clearly recognized.

x: The letters of the newspaper were clearly recognized.

(2) Storage Stability

The curable composition was sealed, and allowed to stand under conditions of a temperature of 23° C. and a relative humidity of 50% to observe its properties.

⊚: The viscosity value of the composition after 7 days passed from the production changed in a range of 3 times or less of the initial value.

◯: The viscosity value of the composition after 24 hours passed from the production changed in a range of 3 times or less of the initial value.

Δ: The viscosity value of the composition after 1 hour passed from the production changed in a range of 3 times or less of the initial value.

x: Simultaneously with the production of the composition, the composition produced heat, and was solidified.

(3) Adhesion Speed

Test pieces (SS400) described in JIS K 6861 "Test Method for n-cyanoacrylate Adhesive" Section 7.1.3 were bonded to each other using the curable composition under conditions of a temperature of 23° C. and a relative humidity of 60%, and a time period for which the adhesive fracture of the test pieces did not occur was measured.

◯: The time period tier which the adhesive fracture of the test pieces did not occur was less than 5 seconds.

x: The time period for which the adhesive fracture of the test pieces did not occur was 15 seconds or longer.

Example 2

A curable composition was obtained using 100 parts by mass of ethyl-2-cyanoacrylate and 2.0 parts by mass of the particle A, and then evaluated in the same manner as those in Example 1 (see Table 1).

Example 3

A curable composition was obtained using 100 parts by mass of ethyl-2-cyanoacrylate and 1.0 part by mass of the particle B, and then evaluated in the same manner as those in Example 1 (see Table 1).

Example 4

A curable composition was obtained using 100 parts by mass of ethyl-2-cyanoacrylate and 2.0 parts by mass of the particle C, and then evaluated in the same manner as those in Example 1 (see Table 1).

Example 5

A curable composition was obtained using 100 parts by mass of ethyl-2-cyanoacrylate and 2.0 parts by mass of the particle D, and then evaluated in the same manner as those in Example 1 (see Table 1).

Comparative Example 1

A curable composition was obtained using 100 parts by mass of ethyl-2-cyanoacrylate and 2.0 parts by mass of the particle E, and then evaluated in the same manner as those in Example 1 (see Table 1).

Comparative Example 2

A curable composition was obtained using 100 parts by mass of ethyl-2-cyanoacrylate and 2.0 parts by mass of the particle F, and then evaluated in the same manner as those in Example 1 (see Table 1).

Comparative Example 3

A curable composition was obtained using 100 parts by mass of ethyl-2-cyanoacrylate and 2.0 parts by mass of the particle G, and then evaluated in the same manner as those in Example 1 (see Table 1).

Comparative Example 4

A curable composition was obtained using 100 parts by mass of ethyl-2-cyanoacrylate and 2.0 parts by mass of the particle H, and then evaluated in the same manner as those in Example 1 (see Table 1).

Comparative Example 5

A curable composition was obtained using 100 parts by mass of ethyl-2-cyanoacrylate and 2.0 parts by mass of the particle I, and then evaluated in the same manner as those in Example 1 (see Table 1).

Comparative Example 6

A curable composition was obtained using 100 parts by mass of ethyl-2-cyanoacrylate and 2.0 parts by mass of the particle J, and then evaluated in the same manner as those in Example 1 (see Table 1).

Comparative Example 7

A curable composition was obtained using 100 parts by mass of ethyl-2-cyanoacrylate and 2.0 parts by mass of the particle K, and then evaluated in the same manner as those in Example 1 (see Table 1).

TABLE 1

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Curable composition (parts by mass) | | | | | | | | | | | | |
| Ethyl-2-cyanoacrylate | 100 | 100 | 100 | 100 | 100 | 100 | 100 | 100 | 100 | 100 | 100 | 100 |
| Particle A | 0.5 | 2 | | | | | | | | | | |
| Particle B | | | 1 | | | | | | | | | |
| Particle C | | | | 2 | | | | | | | | |
| Particle D | | | | | 2 | | | | | | | |
| Particle E | | | | | | 2 | | | | | | |
| Particle F | | | | | | | 2 | | | | | |
| Particle G | | | | | | | | 2 | | | | |
| Particle H | | | | | | | | | 2 | | | |
| Particle I | | | | | | | | | | 2 | | |
| Particle J | | | | | | | | | | | 2 | |
| Particle K | | | | | | | | | | | | 2 |
| Evaluation | | | | | | | | | | | | |
| Concealability | ○ | ○ | ○ | ○ | ○ | ○ | ○ | ○ | ○ | ○ | X | X |
| Storage stability | ◎ | ◎ | ◎ | ○ | ○ | X | Δ | X | X | ○ | ◎ | X |
| Adhesion speed | ○ | ○ | ○ | ○ | ○ | X | X | X | X | X | ○ | X |

INDUSTRIAL APPLICABILITY

The curable composition of the present invention can be used as an adhesive, a coating material, a sealing agent, a reinforcing agent, and the like. In particular, the curable composition has properties of having a high adhesion speed, whereby the curable composition makes it possible to improve the production efficiency and the like of a product using the curable composition. For example, applying the curable composition to a defective portion on the surface of an article, or filling the defective portion with the curable composition can result in efficient formation of a cured resin portion having excellent concealability for the defective portion (base), and whether or not the work has been securely made can be easily determined. Similarly, when a cured resin portion is formed on a surface of an article by using a curable composition, the cured resin portion is usually colored to a color based on a composite particle, whereby whether or not the composition is applied to any position or the position is filled with the composition can be easily determined. When white articles are adhered to each other or a seal portion is formed in a vicinity of the white article, a cured resin portion formed by a curable composition has the color same as or similar to that of the article, whereby the curable composition also has an effect of improving the design property of a (composite) article.

The invention claimed is:

1. A curable composition comprising a 2-cyanoacrylate and a particle containing titanium oxide and silicon oxide,
   wherein proportions of the titanium oxide and the silicon oxide in the particle are 70% to 96% by mass and 4% to 30% by mass, respectively, based on 100% by mass of a total content of the titanium oxide and the silicon oxide.

2. The curable composition according to claim 1, wherein a content of the particle is in a range from 0.1 to 10.0 parts by mass based on 100 parts by mass of the 2-cyanoacrylate.

3. The curable composition according to claim 1, wherein the particle has a covering portion made of the silicon oxide on at least a part of a surface of a granular portion made of the titanium oxide.

4. The curable composition according to claim 1, wherein a maximum length of the particle is in a range from 10 nm to 100 nm.

5. An adhesive composition comprising the curable composition according to claim 1.

6. A curable composition comprising a 2-cyanoacrylate and a particle containing titanium oxide and silicon oxide,
   wherein a maximum length of the particle is in a range from 10 nm to 100 nm.

7. The curable composition according to claim 6, wherein a content of the particle is in a range from 0.1 to 10.0 parts by mass based on 100 parts by mass of the 2-cyanoacrylate.

8. The curable composition according to claim 6, wherein the particle has a covering portion made of the silicon oxide on at least a part of a surface of a granular portion made of the titanium oxide.

9. An adhesive composition comprising the curable composition according to claim 6.

* * * * *